(12) United States Patent
Tsai et al.

(10) Patent No.: US 7,841,236 B2
(45) Date of Patent: Nov. 30, 2010

(54) ELECTRIC DEVICE WITH MOTION DETECTION ABILITY

(75) Inventors: Ming-Jye Tsai, Hsinchu County (TW); Shun-Nan Liou, Kaohsiung (TW); Zhi-Wei Lian, Xindian (TW); Chin-Lin Hsieh, Banqiao (TW)

(73) Assignee: Industrial Technology Research Institute, Hsinchu (TW)

( * ) Notice: Subject to any disclaimer, the term of this patent is extended or adjusted under 35 U.S.C. 154(b) by 725 days.

(21) Appl. No.: 11/432,633

(22) Filed: May 12, 2006

(65) Prior Publication Data

US 2007/0131029 A1 Jun. 14, 2007

(30) Foreign Application Priority Data

Dec. 13, 2005 (TW) .............................. 94144016 A

(51) Int. Cl.
*G01P 3/04* (2006.01)
(52) U.S. Cl. .......................................... 73/510; 73/527
(58) Field of Classification Search ................... 73/488, 73/490, 504.03, 510, 511, 514.01, 527
See application file for complete search history.

(56) References Cited

U.S. PATENT DOCUMENTS

| 5,534,917 | A | 7/1996 | MacDougall | 348/169 |
|---|---|---|---|---|
| 6,375,572 | B1 | 4/2002 | Masuyama et al. | 463/43 |
| 6,421,325 | B1* | 7/2002 | Kikinis | 370/280 |
| 6,456,939 | B1* | 9/2002 | McCall et al. | 701/220 |
| 6,465,585 | B2 | 10/2002 | Luo | 526/128 |
| 6,516,749 | B1* | 2/2003 | Salasidis | 119/421 |
| 6,545,661 | B1 | 4/2003 | Goschy et al. | 345/158 |
| 6,641,482 | B2 | 11/2003 | Masuyama et al. | 463/44 |
| 6,839,542 | B2* | 1/2005 | Sibecas et al. | 455/41.2 |
| 6,894,609 | B2* | 5/2005 | Menard et al. | 340/531 |
| 6,908,386 | B2 | 6/2005 | Suzuki et al. | 463/30 |
| 2002/0126026 | A1* | 9/2002 | Lee et al. | 341/22 |
| 2004/0263479 | A1* | 12/2004 | Shkolnikov | 345/169 |
| 2006/0061550 | A1* | 3/2006 | Fateh | 345/158 |
| 2007/0018964 | A1* | 1/2007 | Moon et al. | 345/173 |

FOREIGN PATENT DOCUMENTS

TW 594553 6/2004

* cited by examiner

*Primary Examiner*—Hezron Williams
*Assistant Examiner*—Samir M Shah
(74) *Attorney, Agent, or Firm*—WPAT, PC; Justin King

(57) ABSTRACT

The present invention relates to an electric device, which comprises: a micro inertial sensing module, for detecting a motion of the electric device with respect to the degree of freedom of six axes and thus issuing a sensing signal basing on the detection; a sensing signal processor, for receiving and processing the sensing signal to form a system processing signal; and a display; wherein the displacements and rotations of the motion detection-enabled electric device is sensed and measured by the micro inertial sensing module for enabling the micro inertial sensing module to generate sensing signals corresponding thereto and thus sending the same to the sensing signal processor for processing, and then the result of the processing is adopted as the input of the motion detection-enabled electric device for causing the motion detection-enabled electric device to response in the display accordingly. Thereby, the functions of the buttons used as inputting interface of conventional portable game devices can be replaced and thus the fatigue and pain of players' fingers caused by the pressing of buttons can be eliminated, moreover, the displaying area of the display can be enlarged since the area reserved for accommodating conventional buttons is voided.

4 Claims, 8 Drawing Sheets

ELECTRIC DEVICE WITH MOTION DETECTION ABILITY

FIELD OF THE INVENTION

The present invention relates to an electric device, and more particularly, to a motion detection-enabled electric device, in that the displacements and rotations of the electric device is sensed and measured by a micro inertial sensing module so as to enable the micro inertial sensing module to generate sensing signals corresponding thereto and thus sending the same to a sensing signal processor for processing, and then the result of the processing is adopted as the input of the motion detection-enabled electric device for causing the motion detection-enabled electric device to response accordingly.

BACKGROUND OF THE INVENTION

Video gaming is more popular than ever, especially for teenagers. There is an estimated eight games were sold every second in 2004, according to industry experts. But with that increased interest in flashy graphics and button-mashing comes increased health concerns since these video games usually involve intense gripping, repetitive punching motions on small buttons and sharp wrist movements while guiding joysticks. As the conventional portable game apparatus 2 shown in FIG. 1, a cross key 21 is employed thereby as the input device so that a player can manipulate the input device while holding the portable game apparatus by hand, thereby enabling game character movement and command selection as being display on the display panel 22. As a player is play a video game on the game apparatus for a long period of time, the extended pressing of the cross key 21 by the thumb of the player appears to play a role in the inflammation and strain of tendons and muscles. There are even a few non-tech terms referring to the swollen muscles and tendons that come from too much game playing, such as "Nintendo Thumb" or "Nintendenitis".

Moreover, repetitive overuse of handheld electronics can cause a player to develop "Carpal Tunnel Syndrome", which is a fairly common condition that occurs when there is too much pressure on a nerve in the wrist. There is usually aching, numbness or tingling in the thumb, some of the fingers and sometimes part of the hand. Although the syndrome can be released temporarily by a swing of one's arm, continued stress on tendons in hands and arms can lead to long-term ailments. In addition, ligament injuries are also commonly injuries caused by long-term video game playing, especially the inflammation at the joint of palm and fingers. The repetitive button-pressing and releasing can cause swelling at the base of the thumb and other fingers and eventually cause pain as the joints are overloaded. It is noted that the displaying area of the display panel 22 is limited so as to make room for the cross key 21 to be disposed on the electric device 2.

There are already several prior-art input devices and method thereof provided by well-known video game companies for improving the abovementioned shortcomings. One of which is a video image based control system disclosed in U.S. Pat. No. 5,531,917. Since the control system disclosed in U.S. Pat. No. 5,531,917 utilizes an improved video-based gesture control technique, the operation of a device can be controlled in response to the movement of a user in the field of view of a video camera, which is comparatively easier to handle and operate comparing to those controlled by joystick and keyboard. However, the type of control offered by these prior-art systems is limited since it can only detect movements, but is not able to determine the intensity of a detected movement.

The input methods for portable game apparatuses, as disclosed in U.S. Pat. Nos. 6,375,572, 6,641,482, and 6,908,386, utilize an biaxial acceleration sensor for detecting acceleration in response to movement or tilt of the portable game apparatus. However, the aforesaid acceleration sensor can only measure the movement and tilt with respect to four axes, i.e. the foresaid portable game apparatus use an XY-axes acceleration sensor 31 to detect accelerations and tilts in X-axis and Y-axis directions. Therefore, since the detection ability of the aforesaid input method is limited, the type of game suitable to be applied thereby is limited. For instance, the aforesaid input method can not detect accelerations and tilts in Z-axis that it can not be used to control a 3-D game. Moreover, as the portable game apparatus disclosed in U.S. Pat. No. 6,641,482 is a device being comprised of a housing and a detachable cartridge whereas the acceleration sensor is fixed on the cartridge, the overall manufacturing cost of this portable game apparatus will be higher than other ordinary game apparatuses.

Therefore, It is in great need to have an electric device with motion detection ability, which is capable of detecting movement with respect to comparatively more degree of freedoms for enabling the electric device to be applicable to various types of video games, and is a device without the buttons used as inputting interface of conventional portable game devices so as to enlarging the viewing area of the display of the electric device.

SUMMARY OF THE INVENTION

In view of the disadvantages of prior art, the primary object of the present invention is to provide an electric device with motion detection ability, in that the displacements and rotations of the electric device is sensed and measured by a micro inertial sensing module so as to enable the micro inertial sensing module to generate sensing signals corresponding thereto and thus sending the same to a sensing signal processor for processing, and then the result of the processing is adopted as the input of the motion detection-enabled electric device for causing the motion detection-enabled electric device to response accordingly, so that the functions of the buttons used as inputting interface of conventional portable game devices can be replaced and thus the fatigue and pain of players' fingers caused by the pressing of buttons can be eliminated.

It is another object of the invention to provide an buttonless electric device with motion detection ability, which has enlarged viewing area since the functions of buttons of conventional portable game devices are replaced by the cooperation of a micro inertial sensing module and a sensing signal processor, both being arranging inside the electric device.

To achieve the above objects, the present invention provides an electric device with motion detection ability, which comprises a micro inertial sensing module and a sensing signal processor. The micro inertial sensing module is further comprised of a first inertial part, a second inertial part and a third inertial part, and is capable of detecting a motion with respect to the degree of freedom of six axes and thus issuing a sensing signal basing on the detection. The sensing signal processor is couple to the micro inertial sensing module for receiving and processing the sensing signal to form a system processing signal to be adopted as an input of the electric device, e.g. the sensing signal received by the video cell of the processor is converted into a display signal to be display by a display of the electric device, or the sensing signal received by the audio cell of the processor is converted into an audio signal to be play by a speaker of the electric device.

Preferably, the electric device with motion detection ability further comprises a display for displaying a response signal generated according to the system processing signal.

Preferably, the electric device with motion detection ability further comprises a networking interface for enabling the electric device to connect to a network thereby so as to update the internal software of the electric device.

Preferably, the first inertial part is used for detecting a displacement measured with respect to a first axis and a rotation measured respect to a second axis. Moreover, the first inertial part is an accelerometer.

Preferably, the second inertial part is used for detecting the a displacement measured with respect to the second axis and rotations respectively measured with respect to the first axis and a third axis. Moreover, the second inertial part is comprised of: a second accelerometer, for detecting the displacement measured along the second axis; and an auxiliary accelerometer, being positioned apart from the second accelerometer by a distance; wherein the rotation measured with respect to the third axis can be acquired by performing a differential operation upon the acceleration variations of one degree of freedom obtained respectively from the detection of the second and the auxiliary accelerometers; and the rotation measured along the first axis is selectively obtained form the detection of the second accelerometer or the auxiliary accelerometer.

In a preferred embodiment of the invention, the second inertial part is used for detecting a displacement measured with respect to the second axis and rotations respectively measured with respect to the first axis and a third axis. Moreover, the second inertial part is comprised of: an accelerometer for detecting the displacement measured along the second axis and the rotation measured along the first axis; and a gyroscope, for detecting the rotation measured along the third axis.

Preferably, the third inertial part is used for detecting a displacement measured with respect to the third axis. Moreover, the third inertial part is an accelerometer.

In another preferred embodiment of the invention, the electric device with motion detection ability of the present invention is comprised of a micro inertial sensing module, a sensing signal processor and a display. The micro inertial sensing module is further comprised of a first inertial part, a second inertial part and a third inertial part, and is capable of detecting a motion with respect to the degree of freedom of six axes and thus issuing a sensing signal basing on the detection; wherein the first inertial part is used for detecting a displacement measured with respect to a first axis and a rotation measured respect to a second axis; and the second inertial part is used for detecting a displacement measured with respect to the second axis and rotations respectively measured with respect to the first axis and a third axis; and the third inertial part is used for detecting a displacement measured with respect to the third axis. The sensing signal processor is couple to the micro inertial sensing module for receiving and processing the sensing signal to form a system processing signal to be adopted as an input of the electric device, e.g. the sensing signal received by the video cell of the processor is converted into a display signal to be display by a display of the electric device, or the sensing signal received by the audio cell of the processor is converted into an audio signal to be play by a speaker of the electric device.

Preferably, the electric device of motion detection ability of the present invention can be a mobile phone or a portable game apparatus.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
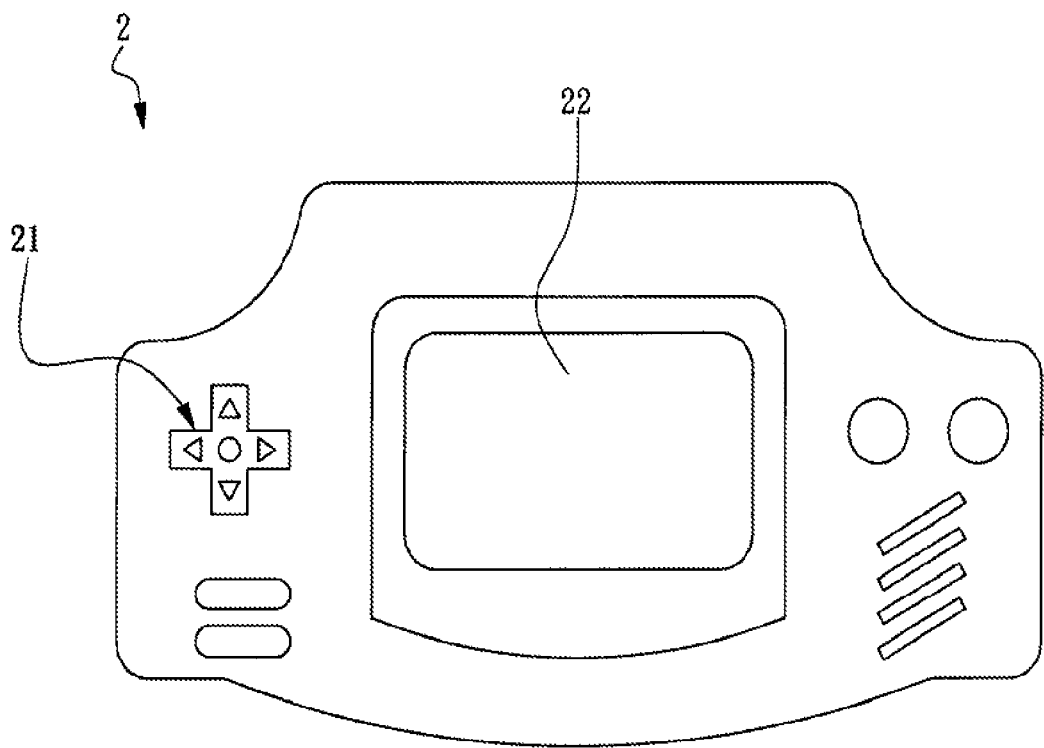
FIG. 1 is a schematic view of a conventional portable game apparatus with input device.
Figure 2:
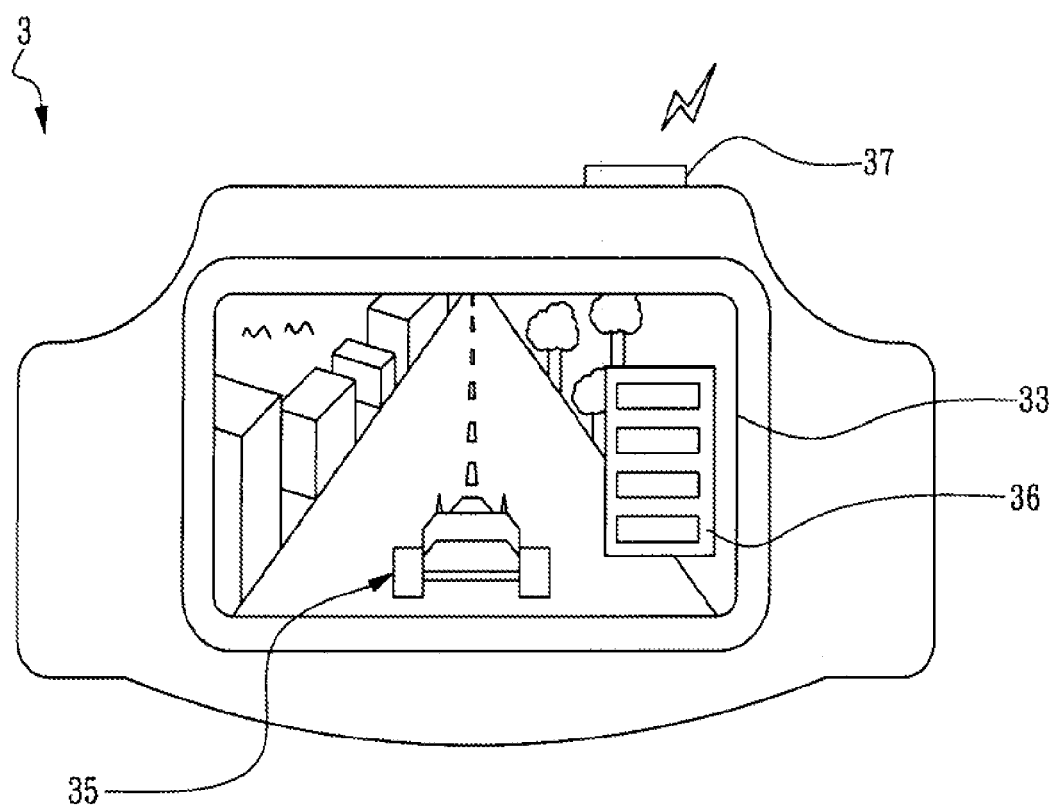
FIG. 2 is a schematic view of an electric device with motion detection ability according to a preferred embodiment of the invention.

Please refer to FIG. 2, which is a schematic view of an electric device with motion detection ability according to a preferred embodiment of the invention. The electric device 3 of FIG. 2 has a display 33 and a networking interface 37 arranged thereon. It is noted that the display 33 can be a flat panel display such as liquid crystal display (LCD), organic light emitting diode (OLED), etc., but is not limited thereby. Moreover, the networking interface 37 enables the electric device 3 to connect to a networking either by a wireless means or by a wired means. Therefore, the electric device with motion detection ability 3 has various applications, such as being applied as a portable game apparatus, or a mobile phone, and so on.

Figure 3:
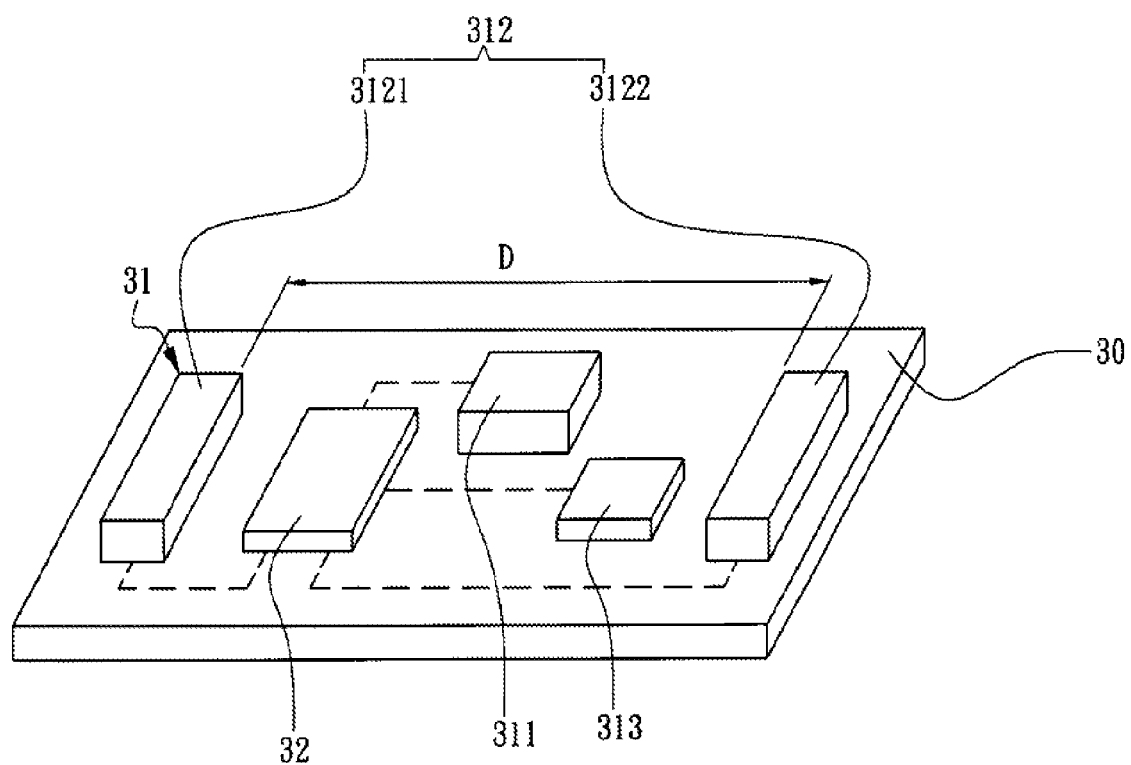
FIG. 3 is a schematic diagram showing the arrangement of inertial parts inside the electric device with motion detection ability according to a preferred embodiment of the invention.
Figure 4:
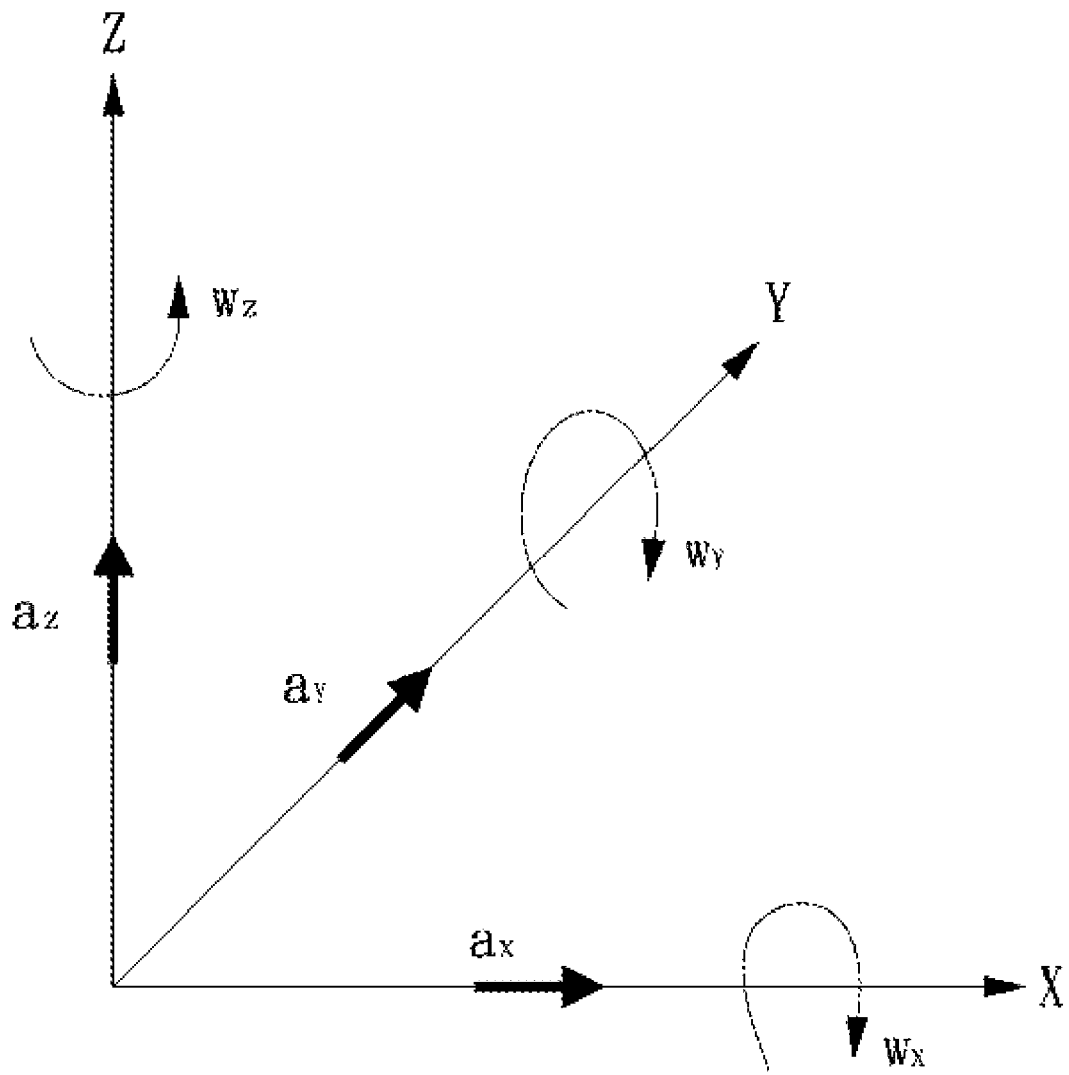
FIG. 4 is a 3-D Cartesian coordinates defining the six degrees of freedom of a space measured and detected by the electric device of the present invention.

Please refer to FIG. 3, which is a schematic diagram showing the arrangement of inertial parts inside the electric device with motion detection ability 3 according to a preferred embodiment of the invention. As seen in FIG. 3, the internal sensing/processing mechanism of the electric device 3 is arranged on a substrate 30, which is comprised of a micro inertial sensing module 31 and a sensing signal processor 32. The micro inertial sensing module 31 is further comprised of an X-axis inertial part 311, a Y-axis inertial part 312 and a z-axis inertial part 313. The arrangement of the inertial parts 311, 312, 313 is to enable the micro inertial sensing module 31 to detect a motion of the electric device 3 with respect to the degree of freedom of six axes and thus issue a sensing signal basing on the detection, whereas the X-axis inertial part 311 is used for detecting a displacement measured with respect to X-axis and a rotation measured respect to Y-axis axis, and the Y-axis inertial part 312 is used for detecting the a displacement measured with respect to Y-axis and rotations respectively measured with respect to X-axis and Z-axis, and the Z-axis inertial part 313 is used for detecting a displacement measured with respect to Z-axis, as shown in FIG. 4.

The signal sensing processor 32 of FIG. 3 is coupled to the micro inertial sensing module 31 for enabling the signal sensing processor 32 to receive and process the sensing signal from the micro inertial sensing module 31 and thus form a system processing signal to be adopted as an input of the electric device 3 to be display on the display 33. For instance, as the electric device 3 is moved to the left by a user, a sensing signal corresponding to the acceleration of the left movement is detected by the micro inertial sensing module 31 and sent to the signal sensing processor 32 to be processed thereby, and then the processor 32 will direct a character 35 displayed on the display 33 to response according to the left movement. It is noted that the left movement of the electric device 3 enabled by the user can be defined as a command for directing the character 35 to move to the left, to brake, to fire a shot, and so on, that is, the sensing signal corresponding to the movement of the electric device 3 can be defined according to the user's preference for directing the character 35 to response accordingly.

In a preferred embodiment of the invention, the X-axis inertial part 311 and the Z-axis inertial part 313 respectively is an accelerometer, while the Y-axis inertial part 312 is further comprised of a major accelerometer 3121, for detecting the displacement measured along Y-axis; and an auxiliary accelerometer 3122, being positioned apart from the major accelerometer 3121 by a distance D, by which the rotation measured with respect to Z-axis can be acquired by performing a differential operation upon the acceleration variations of one degree of freedom obtained respectively from the detection of the major accelerometer 3121 and the auxiliary accelerometer 3122. Moreover, the rotation measured along X-axis is selectively obtained form the detection of the major accelerometer 3121 or the auxiliary accelerometer 3122.

In another embodiment of the invention, the Y-axis inertial part 312 can be otherwise comprised of an accelerometer and a gyroscope, wherein the accelerometer is used for detecting the displacement measured along Y-axis and the rotation measured along X-axis while the gyroscope is used for detecting the rotation measured along Z-axis.

Figure 5A:
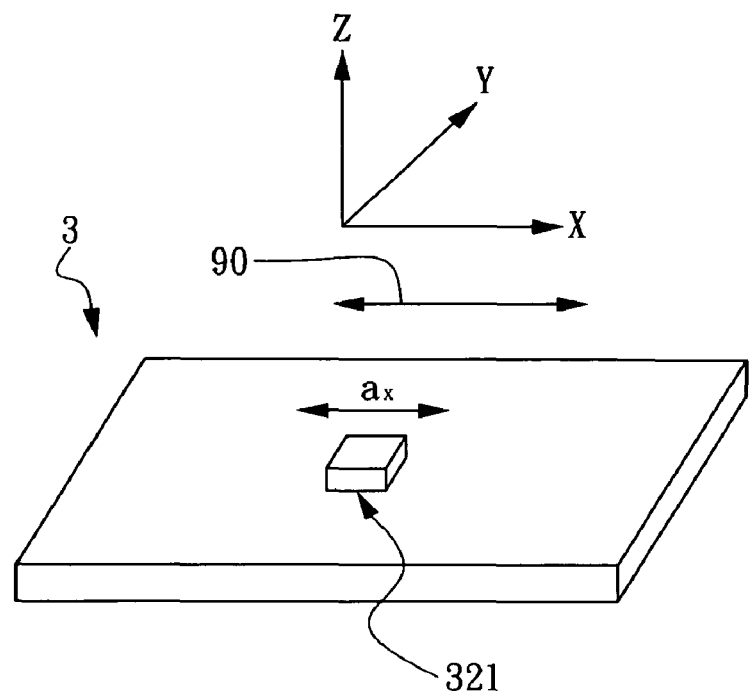
FIG. 5A is a schematic diagram showing the detection of an acceleration measured with respect to the X-axis of a space using an X-axis inertial part according to a preferred embodiment of the invention.
Figure 5B:
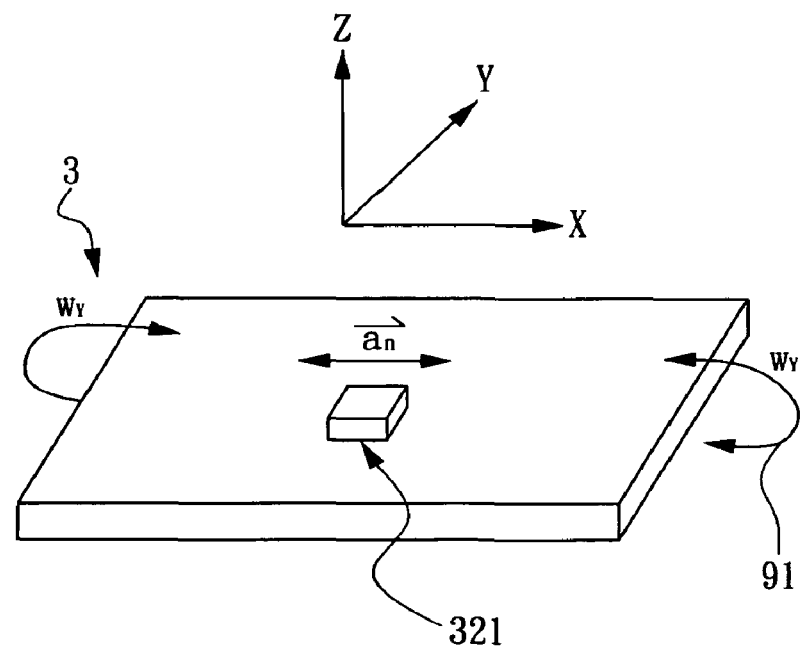
FIG. 5B is a schematic diagram showing the detection of a rotation measured with respect to the Y-axis of a space using an X-axis inertial part according to a preferred embodiment of the invention.

Please refer to FIG. 5A, which is a schematic diagram showing the detection of an acceleration measured with respect to the X-axis of a space using an X-axis inertial part according to a preferred embodiment of the invention. In FIG. 5A, as the electric device 3 is moved horizontally along the X-axis by a user holding the electric device 3, that is, as the electric device 3 is performing a linear movement 90, the X-axis inertial part 311 will detect the acceleration variation $\alpha_x$ of the movement 90 following the X-axis direction, so that a displacement of the electric device 3 can be obtained by integrating the detected accelerations $\alpha_x$ and is displayed on the display 33 of the electric device 3. Please refer to FIG. 5B, which is a schematic diagram showing the detection of a rotation measured with respect to the Y-axis of a space using an X-axis inertial part according to a preferred embodiment of the invention. In FIG. 5B, as the electric device 3 is rotated about the Y-axis by a user holding the electric device 3, that is, as the electric device 3 is performing a clockwise or counterclockwise rotation 91, the X-axis inertial part 311 will detect the angular accelerations $\alpha_n$ of the rotation 91, such that the variation of angular velocity of the rotation 91 can be obtained accordingly and is display on the display of the electric device 3 after it is being processed.

Figure 6A:
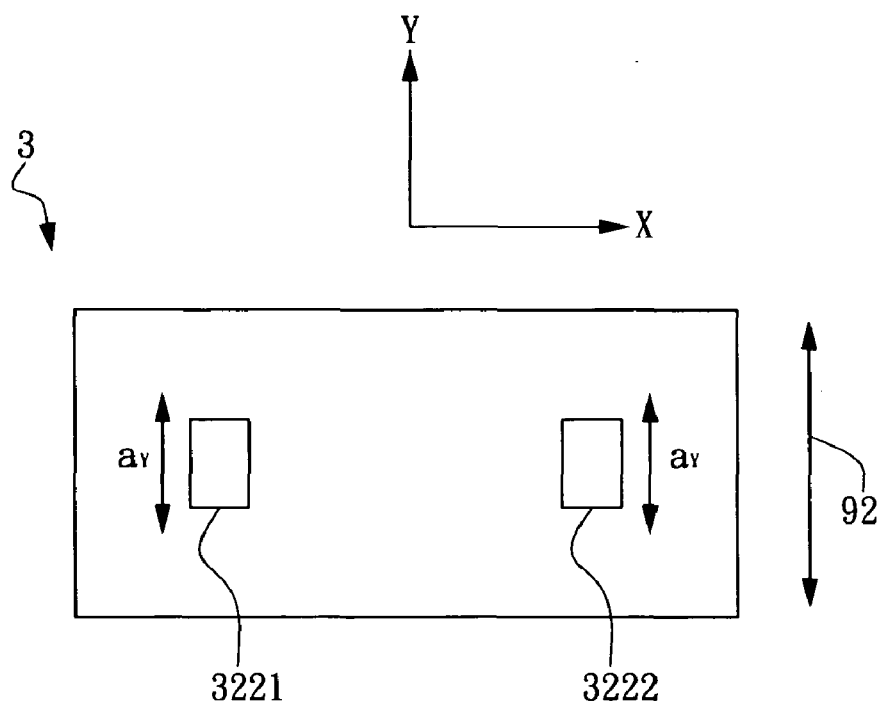
FIG. 6A is a schematic diagram showing the detection of an acceleration measured with respect to the Y-axis of a space using a Y-axis inertial part according to a preferred embodiment of the invention.
Figure 6B:
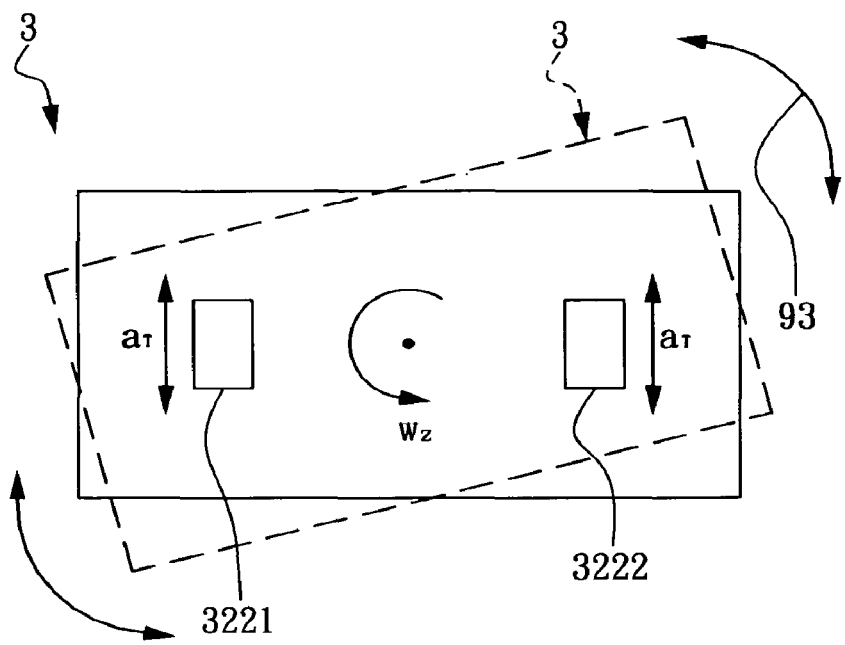
FIG. 6B is a schematic diagram showing the detection of a rotation measured with respect to the Z-axis of a space using a Y-axis inertial part s according to a preferred embodiment of the invention.
Figure 6C:
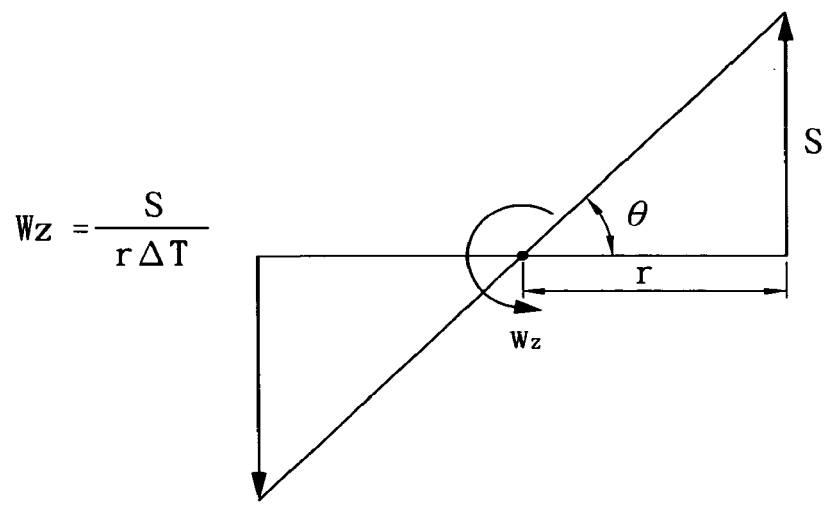
FIG. 6C is an abbreviated drawing of FIG. 6B.

Please refer to FIG. 6A, which is a schematic diagram showing the detection of an acceleration measured with respect to the Y-axis of a space using a Y-axis inertial part according to a preferred embodiment of the invention. In FIG. 6A, as the electric device 3 is moved vertically along the Y-axis by a user holding the electric device 3, that is, as the electric device 3 is performing a linear movement 92, the components of the Y-axis inertial part 312, i.e. the major accelerometer 3121 and the auxiliary accelerometer 3122, will detect the acceleration variation $\alpha_Y$ of the movement 92 following the Y-axis direction, so that a displacement of the electric device 3 can be obtained by integrating the detected accelerations $\alpha_Y$ and is displayed on the display 33 of the electric device 3. Please refer to FIG. 6B, which is a schematic diagram showing the detection of a rotation measured with respect to the Z-axis of a space using a Y-axis inertial part s according to a preferred embodiment of the invention. In FIG. 6B, as the electric device 3 is rotated about the Z-axis by a user holding the electric device 3, that is, as the electric device 3 is performing a clockwise or counterclockwise rotation 93, the major accelerometer 3121 and the auxiliary accelerometer 3122 of the Y-axis inertial part 312 will detect the angular accelerations $\alpha_T$ of the rotation 93, such that the variation of angular velocity of the rotation 91 can be obtained accordingly and is display on the display of the electric device 3 after it is being processed. It is noted that the variation of angular velocity is obtained according to the preferred embodiment shown in FIG. 6C, that is, first a displacement S is calculated by integrating the tangent acceleration so as to obtain the angle θ with respect to the radius r, and then, by dividing the displacement S with the time interval ΔT, the variation of angular velocity $W_Z$ of the rotation 91 can be obtained.

Figure 6D:
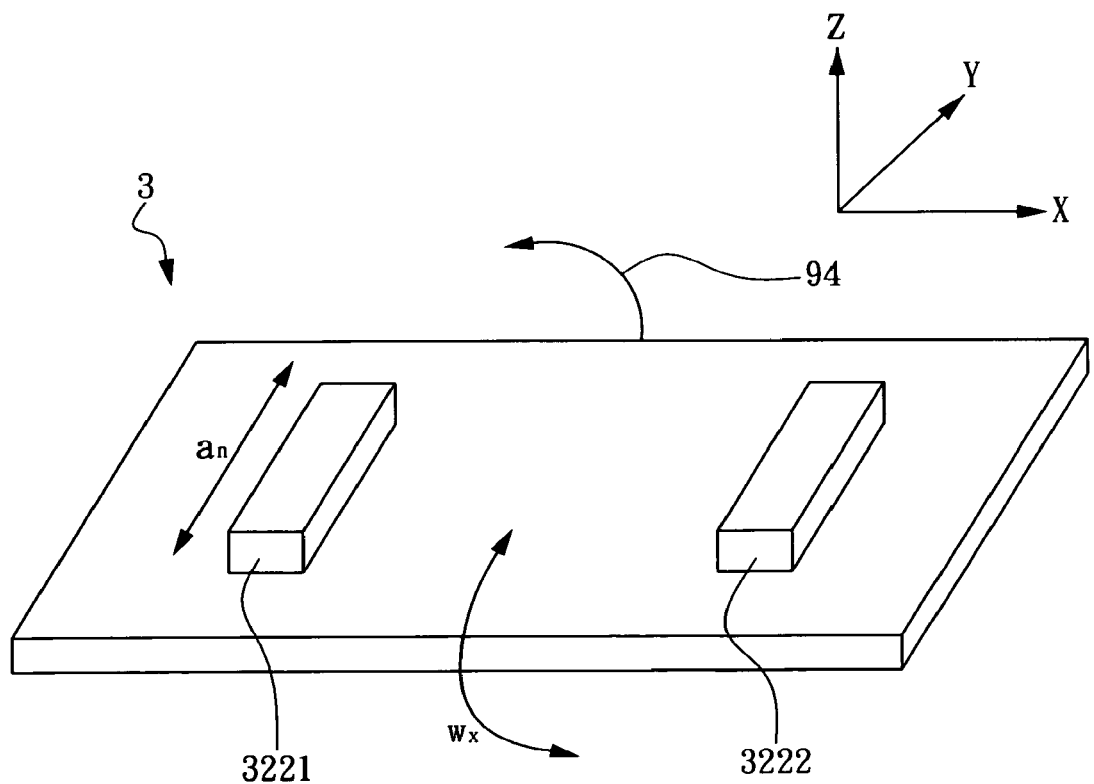
FIG. 6D is a schematic diagram showing the detection of a rotation measured with respect to the X-axis of a space using an Y-axis inertial part according to a preferred embodiment of the invention.
Figure 7:
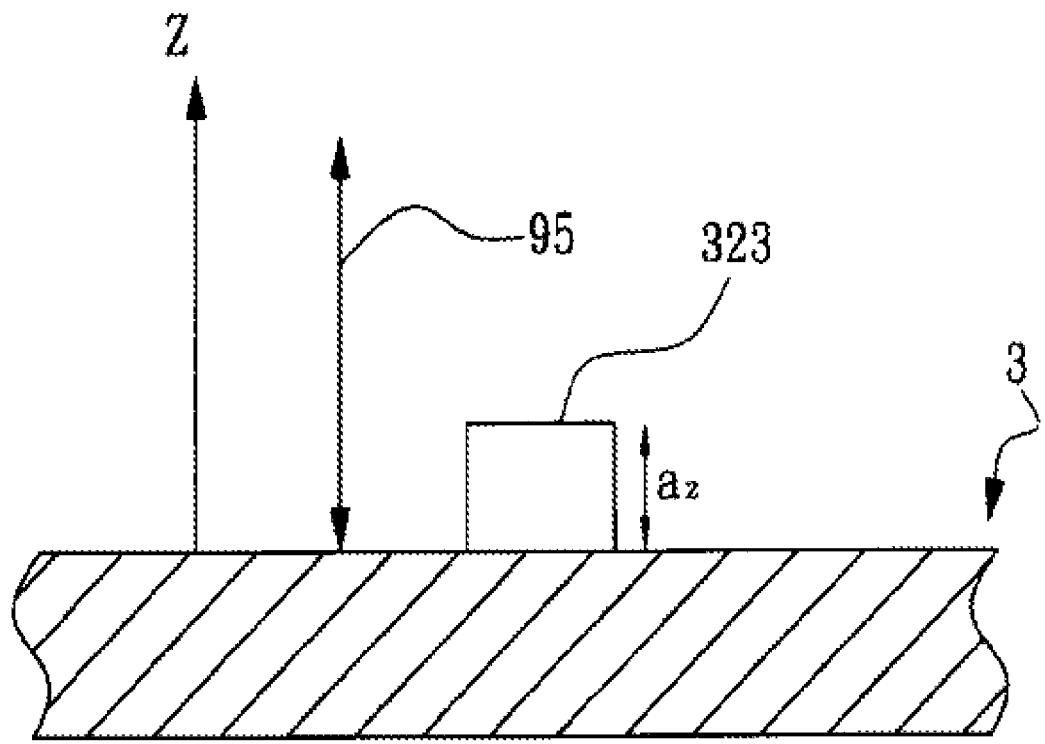
FIG. 7 is a schematic diagram showing the detection of a rotation measured with respect to the Z-axis of a space using a Z-axis inertial part a according to a preferred embodiment of the invention.

Please refer to FIG. 6D, which is a schematic diagram showing the detection of a rotation measured with respect to the X-axis of a space using a Y-axis inertial part according to a preferred embodiment of the invention. In FIG. 6D, as the electric device 3 is rotated about the X-axis by a user holding the electric device 3, that is, as the electric device 3 is performing a clockwise or counterclockwise rotation 94, the major accelerometer 3121 and the auxiliary accelerometer 3122 of the Y-axis inertial part 312 will detect the angular accelerations $\alpha_n$ of the rotation 94, such that the variation of angular velocity of the rotation 94 can be obtained accordingly and is display on the display of the electric device 3 after it is being processed. Please refer to FIG. 7, which is schematic diagram showing the detection of a rotation measured with respect to the Z-axis of a space using a Z-axis inertial part a according to a preferred embodiment of the invention. In FIG. 7, as the electric device 3 is moved along the Z-axis by a user holding the electric device 3, that is, as the electric device 3 is performing a linear movement 95, the Z-axis inertial part 313 will detect the acceleration variation $\alpha_Z$ of the movement 95 following the Z-axis direction, so that a displacement of the electric device 3 can be obtained by integrating the detected accelerations $\alpha_Z$ and is displayed on the display 33 of the electric device 3.

By the ability of detecting a motion with respect to the degree of freedom of six axes enabled by the micro inertial module 31, a user can defined by himself a command composed of a plurality of motions that can be used to direct the character 35 to act accordingly. As shown in FIG. 2, by the motion detection-enabled electric device 3, not only a user interact with the character 35 displayed on the display 33 by moving the electric device 3, but also the selecting of the menu 36 shown on the display 33 can be performed by the movement detection of the micro inertial sensing module 31 of the electric device 3. Moreover, the networking interface 37 can be used for enabling the electric device 3 to connect to a network thereby so as to update the internal software of the electric device 3. In addition, the internal software resided in the electric device 3 can be adopted for controlling a 2-D multimedia game or a 3-D multimedia game, or can be adopted as a volume/beat control of a musical software.

To sum up, by the application of the electric device with motion detection ability of the invention, the functions of the buttons used as inputting interface of conventional portable game devices can be replaced and thus the fatigue and pain of players' fingers caused by the pressing of buttons can be eliminated, moreover, the displaying area of the display can be enlarged since the area reserved for accommodating conventional buttons is voided.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An electric device with motion detection ability, comprising:
    a micro inertial sensing module, further comprising:
        a first accelerometer, for detecting a displacement measured with respect to a first axis and a rotation measured with respect to a second axis;
        an inertial part comprising a second accelerometer for detecting a displacement measured with respect to the second axis and a rotation measured with respect to the first axis, and an auxiliary accelerometer, being positioned apart from the second accelerometer by a distance, wherein a rotation measured with respect to a third axis is acquired by performing a differential operation upon the acceleration variations of one degree of freedom obtained respectively from the detection of the second accelerometer and the auxiliary accelerometer; and
        a third accelerometer for detecting a displacement measured with respect to a third axis; and
    a sensing signal processor coupled to the micro inertial sensing module for receiving and processing a sensing signal to form a system processing signal to be adopted as an input to the electric device.

2. The electric device of claim 1, further comprising a networking interface for enabling the electric device to connect to a network so as to update internal software of the electric device.

3. A portable game apparatus, comprising:
    a micro inertial sensing module, further comprising:
        a first accelerometer, for detecting a displacement measured with respect to a first axis and a rotation measured with respect to a second axis;
        an inertial part comprising a second accelerometer for detecting a displacement measured with respect to the second axis and a rotation measured with respect to the first axis, and an auxiliary accelerometer, being positioned apart from the second accelerometer by a distance, wherein the rotation measured with respect to a third axis is acquired by performing a differential operation upon the acceleration variations of one degree of freedom obtained respectively from the detection of the second accelerometer and the auxiliary accelerometer; and
        a third accelerometer for detecting a displacement measured with respect to a third axis;
    a sensing signal processor coupled to the micro inertial sensing module for receiving and processing a sensing signal to form a system processing signal to be adopted as an input to the electric device; and
    a display, for displaying a response signal generated according to the system processing signal.

4. The electric device of claim 3, further comprising a networking interface for enabling the electric device to connect to a network so as to update internal software of the electric device.

* * * * *